_United States Patent_ [19]

Carter et al.

[11] 4,420,648

[45] Dec. 13, 1983

[54] PROCESS FOR HYDROGENATING ORGANIC COMPOUNDS WITH A SUPPORTED COBALT-SILICA COPRECIPITATED HYDROGENATION CATALYST

[75] Inventors: James L. Carter; Allan E. Barnett, both of Westfield, N.J.

[73] Assignee: Exxon Research and Engineering Co., Florham Park, N.J.

[21] Appl. No.: 77,011

[22] Filed: Sep. 19, 1979

Related U.S. Application Data

[62] Division of Ser. No. 514, Jan. 2, 1979, abandoned.

[51] Int. Cl.$^3$ ................................................. C07C 5/10
[52] U.S. Cl. ..................................... 585/269; 585/250; 585/270; 585/276; 585/277; 564/422; 564/450; 564/490; 564/493; 568/434; 568/462; 568/881
[58] Field of Search ............... 585/269, 270, 250, 276, 585/277; 208/143; 564/422, 450, 490, 493; 568/434, 462, 881

[56] References Cited

U.S. PATENT DOCUMENTS

| | | |
|---|---|---|
| 1,391,666 | 9/1921 | Bosch et al. |
| 2,392,107 | 11/1940 | Teter ................................. 252/207 |
| 2,974,161 | 3/1961 | Keich et al. ....................... 260/491 |
| 2,981,751 | 4/1961 | Keith et al. ....................... 260/524 |
| 3,327,013 | 6/1967 | Frevel et al. ..................... 260/681.5 |
| 3,351,566 | 11/1967 | Taylor et al. ..................... 252/452 |
| 3,547,830 | 12/1970 | Shropshire ........................ 252/452 |
| 3,622,645 | 11/1971 | Carr et al. ........................ 585/270 |
| 3,661,798 | 5/1972 | Cosyns et al. .................... 208/143 |
| 3,697,445 | 10/1972 | Carter .............................. 252/452 |
| 3,859,370 | 1/1975 | Carter et al. ..................... 260/638 B |
| 3,868,332 | 2/1975 | Carter et al. ..................... 252/452 |
| 3,945,944 | 3/1976 | Kang ................................ 252/455 R |
| 4,014,933 | 3/1977 | Boettger et al. ................. 260/563 R |
| 4,088,603 | 5/1978 | Carter et al. ..................... 252/454 |

FOREIGN PATENT DOCUMENTS

| | | | |
|---|---|---|---|
| 1095996 | 12/1967 | United Kingdom | 252/452 |
| 1095997 | 12/1967 | United Kingdom | 252/452 |
| 1146876 | 3/1969 | United Kingdom | 252/452 |

_Primary Examiner_—Charles F. Warren
_Assistant Examiner_—Joseph A. Boska
_Attorney, Agent, or Firm_—Albert P. Halluin

[57] ABSTRACT

Supported coprecipitated cobalt-silica hydrogenation catalysts are disclosed. The catalysts are prepared by: preparing an aqueous reaction mixture containing cobalt cations, silicate anions and solid porous carrier particles under agitation to form a coprecipitate of the cobalt and silicate ions onto said solid porous support particles; heating the aqueous reaction mixture; and adding an alkaline precipitating agent to further precipitate the cobalt and silicate ions onto said solid porous carrier particles. The aqueous reaction mixture may additionally include copper cations.

11 Claims, No Drawings

PROCESS FOR HYDROGENATING ORGANIC COMPOUNDS WITH A SUPPORTED COBALT-SILICA COPRECIPITATED HYDROGENATION CATALYST

This is a division, of application Ser. No. 514, filed Jan. 2, 1979, now abandoned.

BACKGROUND OF THE INVENTION

1. Field of the Invention

This invention relates to coprecipitated cobalt-silica catalysts and their use in hydrogenating organic compounds. In one aspect, this invention relates to the preparation of supported coprecipitated cobalt-silica catalysts. In another aspect, this invention relates to the use of the catalysts, in reduced form, to hydrogenate organic compounds.

2. Description of the Prior Art

The catalytic reduction of organic compounds in the presence of nickel and cobalt catalysts is known. Nickel catalysts, especially supported nickel catalysts, have many commercial uses. For example, U.S. Pat. No. 3,535,271 teaches the use of a nickel catalyst promoted by copper for dehydrogenation, cracking, reforming, polymerization, isomerization, alkylation, as well as other treating processes. Other examples of nickel catalysts and their use in reforming and other processes include U.S. Pat. Nos. 2,750,261; 3,205,182; 3,351,566; 3,417,029; 3,697,445; 3,859,370; 3,868,332; 4,088,603; 3,417,029; and Belgium Patent No. 841,812 (which generally corresponds to U.S. application Ser. No. 577,328). In all of these patents, the catalysts are prepared by coprecipitation or impregnation processes wherein the catalytic metal precursors are either precipitated from solution in the presence of a support material or solution containing said precursor or impregnated into the pores of a porous support material. In the British Patent No. 1,220,105, for example, aqueous solutions are employed in conjunction with a homogeneous precipitation procedure to give highly dispersed nickel catalyst.

D. J. C. Yates, W. F. Taylor and J. H. Sinfelt (*J. Am. Chem. Soc.*, 86, 2996 [1964]) described a chemisorption technique and its utility in correlating nickel particle size (and/or nickel surface area) with catalytic activity. In FIG. 3 of their publication, there is shown that a direct relation exists between reduced nickel surface area ($m^2/g$ of catalyst) and initial reaction rate for ethane catalytically converted into methane (as mmoles $C_2H_6$ converted per hour per gram of catalyst). It follows, then, that methods which increase the nickel surface area of a nickel catalyst (other factors such as nickel content remaining constant) is a desirable feature, leading to a catalyst of improved catalytic activity. Patentees of U.S. Pat. Nos. 3,697,445; 3,859,370 and 3,868,332 also appreciated that by achieving a higher degree of dispersion of nickel in the catalyst results in a more active catalyst and indeed they obtain a fairly high degree of dispersions by their coprecipitation techniques wherein nickel cations were gradually precipitated from an aqueous solution in the presence of silicate anion and solid porous particles to obtain dispersion greater than 70 $m^2/g$ of reduced nickel metal per gram of catalyst. Belgium Patent No. 841,812 teaches that the addition of copper ions during the precipitation step provides a catalyst that can be reduced at temperatures of approximately 200° C. U.S. Pat. No. 4,088,603 discloses an improved method of activating the coprecipitated nickel-copper-silica catalysts.

A number of patents have disclosed cobalt, cobalt-nickel and cobalt-nickel-copper catalysts, e.g., U.S. Pat. Nos. 3,166,491; 3,385,670; 3,432,443; 3,547,830; 3,650,713; 3,661,798; 3,945,944; 4,014,933 and 4,026,823; and British Patent Nos. 1,000,828; 1,000,829; 1,095,996; 1,095,997 and 1,182,829. None of these patents, however, disclose coprecipitation of cobalt salts and silicate ions in the presence of the porous carrier particles.

In some of the above-mentioned patents, for example, U.S. Pat. Nos. 3,697,445; 3,859,370; 3,868,332 and Belgium Patent No. 841,812 it is mentioned that cobalt or iron may be used in place of nickel in the coprecipitation process. However, these patents only show nickel (in the examples) as the non-noble Group VIII catalytic metal used.

DISCOVERY OF THE PRESENT INVENTION

It has been discovered that, contrary to the suggestions in the aforementioned prior art, the non-noble Group VIII metals are not equivalent in terms of their catalytic properties and/or reduced metal surface area when prepared by coprecipitation in the presence of silicate anions and solid carrier particles. In this connection, it has been found that when nickel is replaced by iron in the process of U.S. Pat. No. 3,697,445, the resulting calcined and reduced catalyst does not appreciably catalyze the hydrogenation of benzene to cyclohexane while the initial argon B.E.T. surface area of the catalyst was 256 $m^2/g$. However, quite surprisingly, when nickel is replaced by cobalt in the process of U.S. Pat. No. 3,697,445, the resulting catalyst following calcination and reduction at 400° C., has a relatively low metal reduced surface area as determined by hydrogen chemisorption (i.e., from 5 to 20 $m^2/g$ of catalyst), but a high catalytic hydrogenation activity. The hydrogenation activity of the coprecipitated cobalt-silica catalyst is higher than anticipated in light of the low value of reduced metal surface area of the coprecipitated catalyst relative to the nickel catalyst prepared by the same procedure. Surprisingly, the supported coprecipitated cobalt catalyst of the present invention has about twice the activity of the supported coprecipitated nickel-copper-silica catalyst of Belgium Patent No. 841,812 even though it generally has less than half of the reduced metal surface area of the nickel-copper-silica catalyst of said patent.

SUMMARY OF THE INVENTION

In one embodiment of the invention, there is provided a supported cobalt-silica coprecipitated hydrogenation catalyst characterized as having a B.E.T. total surface area ranging from about 150 to about 350 $m^2/g$ and a reduced cobalt surface area ranging from about 5 to about 20 $m^2/g$ as determined by hydrogen chemisorption, after reduction at 400° C., wherein the amount of cobalt in the catalyst ranges from about 25 wt. % to about 70 wt. % based on the total weight of the catalyst. Preferably, this catalyst will contain less than 0.1 wt.% sodium based on the total weight of the active catalyst. The catalyst of the present invention may additionally include coprecipitated copper in an amount ranging from about 2 wt. % to about 10 wt. % based on the weight of the catalyst. The presence of the copper serves to facilitate reduction of the catalyst at lower temperatures, i.e., 200° C.

In another embodiment of the invention, there is provided a process for preparing a supported coprecipitated cobalt-silica catalyst comprising the steps:

(a) preparing a reaction mixture comprising an aqueous solution containing cobalt ions, silicate ions and solid porous carrier particles under agitation to form a coprecipitate of the cobalt and silicate ions onto said solid porous support particles;

(b) heating the aqueous reaction mixture; and (c) adding an alkaline precipitating agent to further coprecipitate the cobalt and silicate ions onto said solid porous support particles.

Preferably, the proportions of materials in the reaction mixture will be sufficient to provide from about 25 wt. % to about 70 wt. % cobalt based on the total weight of the calcined and reduced catalyst.

In this process copper ions may be added to the aqueous reaction mixture in an amount sufficient to provide from about 2 wt. % to about 10 wt. % of copper in the catalyst, the weight percent being based on a total weight of the catalyst. Following preparation of the catalyst, the catalyst may be calcined under oxidative conditions at a temperature ranging from about 300° to about 450° C. and reduced at temperatures ranging from about 75° C. to 400° C.

In still another embodiment of the present invention, there is provided a process for hydrogenating organic compounds which comprises contacting at least one hydrogenatable organic compound with a reducing agent such as hydrogen in the presence of the hereinabove described catalyst preparation in its calcined and reduced state. Typical organic compounds which may be reduced by the process of the invention include aromatic compounds, such as benzene, olefins, aldehydes and nitriles.

DESCRIPTION OF THE PREFERRED EMBODIMENT

As generally discussed above, the catalysts of the present invention are prepared by preparing a reaction mixture comprising an aqueous solution containing cobalt cations (which may optionally include copper cations), silicate anions and solid porous carrier particles as the support material such as kieselguhr. Preferably a solution containing the cation(s) is uniformly comingled with the silicate anion solution with solid porous carrier particles slurried therein, by the addition of the cation-containing solution to the support-containing silicate solution over a period of approximately 5 to 40 minutes. Alternatively, the solution containing silicate anions may be added to the solution of cobalt cations with the solid porous support particles slurried therein. By comingling the previously prepared solutions, the amount of dissolved cobalt (and optionally with the copper cations) in the reaction mixture may be kept exceedingly low and in general well below 0.60 moles/liter of the aqueous reaction mixture. This dilution of the dissolved cobalt ions is preferred in obtaining high catalytic activity. Also, the addition should be made at a substantially constant rate accompanied by vigorous mixing to increase uniformity in the catalyst formation. The mixture is then heated, preferably to its boiling point at atmospheric pressure, and a precipitating agent is added to further coprecipitate the remaining dissolved cobalt and optionally copper with the silicate anions onto the porous support particles.

During catalyst preparation, water is added to the reaction mixture to maintain a nearly constant volume so that water loss by evaporation is continually replaced. The aqueous reaction mixture is preferably kept at its boiling point (at atmospheric pressure) for a period of one to five hours (although heating at a temperature below the boiling point of the solution, i.e., 60°–99° C., may be employed to minimize evaporation); it is then filtered and the resulting product is washed repeatedly with boiling water to remove alkali metals and other impurities. (Generally the washings will be four or more times). Then, the catalyst is dried at temperatures ranging from 90°–200° C., for one to five hours and calcined in an oxygen source, e.g., an oxygen-containing gas such as air to a temperature ranging from 300°–450° C., for a period of 2–8 hours, preferably 3–5 hours. The finished catalyst can then be charged directly (or subsequent to shaping or extruding such as in the form of tablets or pellets) into the reaction vessel, without activation, and activated in the reaction vessel with a gaseous reductant, usually flowing hydrogen.

As stated previously, the cobalt-containing solution and the silicate-containing solution are preferably comingled under conditions of dilution such that the amount of dissolved cobalt ions in the resultant reaction mixture is maintained exceedingly low thereby providing for a high catalytic activity. Additionally, however, it is preferred that in preparing the catalyst of this invention, the coprecipitation of the catalyst is made from dilute solutions, i.e., the cobalt-containing solution should have a cobalt concentration no greater than 1.0 moles/liter and the other solution a silicate ion (e.g.) alkali metal metasilicate concentration no greater than 0.4 moles/liter. When copper cations are included in the reaction mixture the copper concentration is determined by the desired amount of copper in the catalyst. The most preferred solution used in preparing the catalyst has no more than 0.75 moles/liter of cobalt, more preferably less than 0.6 moles/liter and 0.26 moles/liter of silicate ions, e.g., sodium metasilicate. This is contrasted with a more concentrated precipitation in which the solution contains up to twice as much solute. The mole ratio of cobalt to silicate employed ranges from about 0.3:1 to about 2.5:1 in the calcined and reduced catalyst.

In the case of the silicate-porous silica based catalysts about 30 to 90 wt. % of the total silica content of the activated catalyst is derived from precipitated silicate ions when the solid porous particles are comprised of silica. Preferably, however, 50 to 70 wt. % of the total silica content is derived from the silicate ions when the solid porous particles are comprised of silica.

The remaining steps in preparing and activating the catalyst are identical to those described above.

In a preferred aspect of the invention the catalyst of the invention is formed by coprecipitating cobalt (and optionally including copper) and silicate ions onto a porous solid particulate support preferably solid porous silica particles from an aqueous solution. In this preferred embodiment of the invention, two distinct solutions are prepared with solid porous particles slurried in one of them. In one of these solutions is a silicate ion source such as alkali metal silicates, i.e., sodium and potassium silicates, sodium metasilicate, etc. or silicic acid ion source which is preferably slurried in an aqueous mixture containing solid porous particles.

A second solution, containing a source of cobalt cation (and optionally copper cation) is also prepared; the source of the cobalt cation may be any of the following: cobaltous nitrate, cobaltous chloride and cobaltous bromide. The source of the copper cation may be also copper nitrate, copper chloride and copper bromide.

Other sources of cobalt and copper cations and silicate ions may utilized and may be obvious to one skilled in the art. The salts of the metal are the water soluble compounds, e.g., nitrates, halides, formates, or oxalates.

As discussed above, the solid porous particles, preferably silica particles, will be slurried in either the silicate ion solution or the cobalt containing solution. In particular, kieselguhr, infusorial earth, diatomaceous earth, siliceous earth, silica or alumina will be the source of the porous particles. The concentration of the porous solid particles can be expressed as percent of total silica in the catalyst and should be from 10 to 70 wt. %, preferably from 30 to 50 wt. %.

The solution containing the cation(s) and the other solution containing the silicate ions, with one containing the solid porous particles, are comingled at a slow rate to effect maximum mixing. Typically, the cobalt (which may optionally include copper ions) solution would be added to a sodium metasilicate solution, with kieselguhr slurried therein uniformly over approximately a 5 to 40 minute period, preferably 10 to 30 minute period. Alternatively the solution containing sodium metasilicate may be added to the cobalt solution, which has the kieselguhr slurried therein. The mixture is then heated. Coprecipitation is completed by various methods known in the art, but it is most preferred that the coprecipitation of the cobalt (and optionally the addition of copper) and silicate ions in the aqueous solution containing the solid porous particles be completed by the addition of a water-soluble alkaline precipitating agent. The alkaline ammonium precipitants are most suitable for minimizing the amount of alkali metal residue which has to be removed by washing to avoid poisoning action on the finished catalyst. In some instances, the potassium precipitants may be used where the potassium acts as a promoter rather than a poison. Sodium carbonate is still another example of a suitable water-soluble alkaline precipitating compound. Various organic alkaline materials may be used to complete the precipitation such as urea, primary and secondary amines. However, a preferred precipitating agent is ammonium bicarbonate.

The precipitated catalyst is preferably washed to remove impurities, particularly sodium. It it is desired to remove the trace levels of sodium in the catalyst, one may wash the filter cake with a washing liquor comprising a mixture of water and a small amount, i.e., about 100 ppm of a filtering aid such as sodium or potassium carbonate or nitrate or 200 ppm of ammonium carbonate. In this connection reference is made to U.S. Pat. No. 4,105,591, the disclosure of which is incorporated herein by reference.

After the washing, drying and calcining is completed, the catalyst must be reduced in order to activate it. Reduction is carried out in the presence of a reducing gas which is preferably hydrogen. The reducing gas is passed over the catalyst at ambient temperature at a rate of 5 l/hr/gm to 30 l/hr/gm and then the temperature is raised to a range of from 75° C. to 400° C. In the case of the cobalt-copper-silica supported catalyst of the invention lower temperatures of reduction may be employed, i.e., 80° C. to 250° C.

The reduction (activation) is preferably carried out after the catalyst has been loaded into the reaction vessel (in the case of the cobalt-copper-containing catalyst) where the hydrogenation will be carried out, which may be either batch or continuous. The nature of the reactor will be obvious to one skilled in the art. The activation procedure of U.S. Pat. No. 4,088,603 may be used with the catalyst of the present invention.

The activated catalyst is sensitive to deactivation and may not be stored in the presence of oxygen at ordinary temperatures without first being passivated. The passivation step may consist of purging the reactor at a temperature greater than 300° F. with an inert gas, preferably nitrogen, cooling to ambient temperature and then passing the inert gas over the catalyst while an air bleed is introduced into the inert gas so as to have approximately 1–2 mol percent oxygen present. This procedure will passivate the catalyst by putting a surface oxide coating on it. Preferably, the catalyst will be passivated by the process of U.S. Pat. No. 4,090,980, the disclosure of which is incorporated herein by reference.

The resulting catalyst preferably is capable of having a cobalt surface area ranging from about 5 to about 20 $m^2/g$ as determined by hydrogen chemisorption after reduction at 400° C. The cobalt surface area as referred to herein is determined by hydrogen chemisorption after reduction at 400° C. unless otherwise specified, in the manner described by Yates, Taylor and Sinfelt in *J. Am. Chem. Soc.*, 86, 2996 (1964), the disclosure of which is incorporated herein by reference. The cobalt surface area is reported as square meters per gram of total catalyst. The B.E.T. total surface area of the catalyst of the invention will generally range from about 150 to about 350 $m^2/g$, preferably from about 225 to about 300 $m^2/g$. The method for measuring the total catalyst surface area known as the B.E.T. method is described in Emmett, P.H. *Advances in Catalysis*, I, 65 (1948). Also, the catalyst preferably contains about 0.1 wt. % or less of sodium and preferably from 25 wt. % to about 60 wt. % of cobalt.

The catalysts of the instant invention are useful in hydrogenating hydrogenatable organic compounds. In this connection the catalysts of the instant invention may be used to hydrogenate aromatic containing compounds as typified by the hydrogenation of benzene to cyclohexane, the hydrogenation of aldehydes, both saturated and unsaturated to the alcohols as in the well-known oxo process, the hydrogenation of the double bonds in edible fats and oils as well as other olefins both straight and branched chain, the hydrogenation of aromatics in white oil base stock to produce high-grade white oil, the hydrogenation of nitro compounds to amines and the hydrogenation of nitriles to amines. Indeed, olefins as used herein signify unsaturated compounds having at least one multiple bond and contemplates polyunsaturated compounds as well.

The conditions for the hydrogenation reactions have been discussed very widely and are well known to those skilled in the art; broadly the following conditions may be utilized: temperatures ranging from about 25° C. to 300° C., preferably from 75° C. to 250° C.; pressures ranging from 1 atmosphere to 800 atmospheres, preferably from 1 atmosphere to 50 atmospheres; feed rates of from 0.2 to 100 volumes per hour per volume of catalyst and hydrogen addition of from 500 to 10,000 standard cubic feet per barrel (SCF/B) of feed may be used.

In the case of the oxo process, i.e., the addition of carbon monoxide and hydrogen to alkene to produce alcohols, aldehydes and other oxygenated organic compounds, one would typically employ conditions such that the temperatures would range from about 70° C. to 175° C. and use a hydrogen-to-hydrocarbon mole ratio of 0.5 to 10 and a pressure of 100 to 1000 psig. The alkenes used in such a process would typically contain 2 to 20 carbon atoms. The product of such a carbonylation process generally consists of aldehydes, acetals, unsaturated oxygenated materials and the like which require hydrofinishing in a second or further hydrogenation stage. It is to the treatment of the aldehyde product, in particular, that the present invention applies. Hydrogenation conditions in this further reaction stage follow those generally employed in the first stage.

Another useful improved hydrogenation is the conversion of aromatics in white spirits to yield high quality solvents. The upgrading of white spirits by the process of the instant invention is an improvement in the treatment of such materials.

Still another useful improved hydrogenation of the invention is the conversion of olefins in paraffin solvents such as denonenizer bottoms and deoctenizer overheads.

Two especially useful hydrogenation processes included within the scope of the invention include the hydrogenation of aromatics such as benzene to cyclohexane and the production of amines from nitro compounds and nitriles. For example, the invention is useful in converting $C_{12}$ to $C_{24}$ nitriles to the corresponding fatty acid amines. Also, aromatic nitro compounds may be converted to amines, e.g., nitrobenzene to aniline or the conversion of aromatic amines to cycloaliphatic amines, e.g., aniline to cyclohexyl amine.

The following examples serve to more fully describe the manner of making and using the above-described invention, as well as to set forth the best modes contemplated for carrying out various aspects of the invention. It is understood that these examples in no way serve to limit the true scope of this invention, but rather, are presented for illustrative purposes.

EXAMPLE 1

Catalyst A was prepared as follows: 62.7 g of $Co(NO_3)_2.6H_2O$ was dissolved in 280 ml of distilled water, then 21.3 g of $Na_2SiO_3.9H_2O$ was dissolved in another 280 ml of distilled water and 2.8 g of acid-washed kieselguhr was slurried in the first solution containing the cobaltous salt.

The first solution with the kieselguhr slurried therein was stirred vigorously while the second solution containing the sodium metasilicate was added at a uniform rate over a 20-minute period. This mixture was then heated to the boiling point of the solution (at atmospheric pressure) and 44.7 g of $NH_4HCO_3$ was added at a uniform rate over a 20-minute period. This mixture was kept at the boiling point of the solution for 3 hours while stirring was continued. It was then filtered and washed 2 times with boiling distilled water, each wash consisting of 1 liter of the distilled water. The filter-cake was then dried at 120° C. and calcined in air for 4 hours at 400° C. The reduced cobalt surface area of catalyst A was determined by hydrogen chemisorption, after reduction at 400° C. to be 10.4 $m^2/g$ of catalyst. The catalyst by the above procedure had a nitrogen B.E.T. total surface area of 170 $m^2/g$.

EXAMPLE 2

Catalyst B was prepared in the same manner as catalyst A except that the first solution containing the cobalt also contains 3.8 g of $Cu(NO_3)_2.3H_2O$ dissolved therein.

EXAMPLE 3

Catalyst C was prepared as follows: 112 g of $Ni(NO_3)_2.6H_2O$ was dissolved in 500 ml of distilled water, then 38 g of $Na_2SiO_3.9H_2O$ was dissolved in another 500 ml of water and 5 g of acid washed kieselguhr was slurried in the second solution. The second solution with kieselguhr slurried therein was stirred vigorously while the first solution containing the nickel salt was added at a uniform rate over a 20-minute period. This mixture was then heated to the boiling point of the mixture (at atmospheric pressure) and 80 gm. of $NH_4HCO_3$ was added at a uniform rate over a 20-minute period. The mixture was kept at the boiling point of the reaction mixture for 3 hours while stirring continued. It was then filtered and washed 5 times with boiling water, each wash consisting of 500 ml of distilled water. The filter-cake was then dried at 120° C. and calcined in air for 4 hours at 400° C. The reduced nickel surface area was determined by hydrogen chemisorption, after reduction at 400° C., to be 65 $m^2/g$ and it had a B.E.T. total surface area of 292 $m^2/g$.

EXAMPLE 4

Catalyst D was prepared as follows: 8.75 gm of $Cu(NO_3)_2.3H_2O$ and 112 gm of $Ni(NO_3)_2.6H_2O$ were dissolved in 500 ml of distilled water, then 38 gm of $Na_2SiO_3.9H_2O$ was dissolved in another 500 ml of distilled water and 5 gm of acid washed kieselguhr was slurried in the second solution. The second solution with the kieselguhr slurried therein was stirred vigorously while the first solution containing the copper and nickel salt was added at a uniform rate over a 20-minute period. This mixture was then heated to the boiling point of the reaction mixture and 80 gm of $NH_4HCO_3$ was added at a uniform rate over a 20-minute period. This mixture was kept at the boiling point of the mixture for 3 hours while stirring continued. It was then filtered and washed 5 times with boiling water, each wash consisting of 500 ml of distilled water. The filter-cake was then dried at 120° C. and calcined in air for 4 hours at 400° C. The reduced nickel surface area of Catalyst D was determined by hydrogen chemisorption, after reduction at 400° C., to be 61.3 $m^2/g$ and it had a B.E.T. total surface area of 259 $m^2/g$.

Each of Catalysts A, B, C and D was used to hydrogenate benzene to cyclohexane to ascertain their relative hydrogenation catalytic capabilities. The results of this comparison are shown in Table I.

TABLE I

| Catalytic Conversion of Benzene to Cyclohexane[a] | | | | | | | |
|---|---|---|---|---|---|---|---|
| Catalyst A ($Co/SiO_2$) | | Catalyst B ($Co/Cu/SiO_2$) | | Catalyst C ($Ni/SiO_2$) | | Catalyst D ($Ni/Cu/SiO_2$) | |
| Time (min) | Benzene Conversion % | Time (min) | Benzene Conversion % | Time (min) | Benzene Conversion % | Time (min) | Benzene Conversion % |
| 35 | 84.5 | 30 | 21.7 | 30 | 63.1 | 30 | 40.6 |
| | | | | | | 45 | 43.4 |
| 60 | 84.6 | 60 | 18.4 | 60 | 61.8 | 60 | 42.6 |
| 90 | 81.4 | 90 | 17.7 | 90 | 61.1 | 90 | — |
| | | | | | | 105 | 40.0 |
| 120 | 78.0 | 120 | 16.5 | 120 | 57.4 | 120 | — |

TABLE I-continued

| Catalytic Conversion of Benzene to Cyclohexane[a] | | | | | | | |
|---|---|---|---|---|---|---|---|
| Catalyst A (Co/SiO$_2$) | | Catalyst B (Co/Cu/SiO$_2$) | | Catalyst C (Ni/SiO$_2$) | | Catalyst D (Ni/Cu/SiO$_2$) | |
| Time (min) | Benzene Conversion % | Time (min) | Benzene Conversion % | Time (min) | Benzene Conversion % | Time (min) | Benzene Conversion % |
|  |  | 180 | 16.0 | 180 | 54.1 |  |  |
| 240 | 74.0 | 240 | 14.7 | 210 | 58.5 | 240 | 38.5 |
|  |  |  |  | 240 | 57.7 |  |  |

[a]Reaction Conditions: Pressure: 1 atmosphere; Temperature: 76–77° C.; Feed: 90% n-hexane, 10% benzene; Feed rate: 20 cc/hr; H$_2$ rate: 20.4 l/hr; Catalyst charge: 0.25 gm (catalyst reduced 16 hr at 400° C.)

The data in Table I show that Catalyst A, the cobalt-/SiO$_2$ catalyst had a higher activity for hydrogenating benzene than does the corresponding nickel-silica coprecipitated catalyst (Catalyst C) prepared in accordance with U.S. Pat. No. 3,697,445, even though the latter catalyst, when reduced at 400° C., has a relatively higher metal surface area than the cobalt-silica coprecipitated catalyst of the instant invention. The data in Table I also shows that the nickel-copper-silica coprecipitated catalyst has a higher activity for hydrogenation of benzene than does Catalyst B (the cobalt-copper-silica coprecipitated catalyst) which is believed to be attributed to the copper concentrating in the surface and since copper itself has very low hydrogenation activity the catalyst has a low activity.

EXAMPLE 5

Catalyst E was prepared in the same manner as Catalyst B except that it was reduced at 200° C. for 16 hours instead of at 400° C. for 16 hours.

EXAMPLE 6

Catalyst F was prepared in the same manner as Catalyst D except that the catalyst was reduced at 200° C. for 16 hours instead of at 400° C. for 16 hours.

TABLE II

| Catalytic Conversion of Benzene to Cyclohexane[a] | | | |
|---|---|---|---|
| Catalyst E (Co/Cu/SiO$_2$) | | Catalyst F (Ni/Cu/SiO$_2$) | |
| Time (min) | Benzene Conversion % | Time (min) | Benzene Conversion % |
| 60 | 46.6 | 60 | 79.2 |
| 90 | 44.4 | 90 | 77.8 |
| 120 | 44.0 | 150 | 78.0 |
|  |  | 240 | 77.3 |

[a]Reaction Conditions: Pressure: 1 atmosphere; Temperature: 76–77° C.; Feed: 90% n-hexane, 10% benzene; Feed Rate: 20 cc/hr; H$_2$ rate: 20.4 l/hr Catalyst charge: 0.25 gm (catalyst reduced 16 hrs @ 200° C.)

EXAMPLE 7

Catalyst G was prepared as follows: 91.2 gm of Fe(NO$_3$)$_3$.9H$_2$O was dissolved in 500 ml of distilled water. To this solution there was added 2.8 gm of kieselguhr followed by the addition under conditions of vigorous mixing 200 ml of an aqueous solution containing 21.26 gm of Na$_2$SiO$_3$.9H$_2$O. Mixing of this comingled solution was continued and followed by heating to about 80° C. The coprecipitation was completed by the addition of 67.2 gm of ammonium bicarbonate. The mixture was mixed for an additional 30 minutes after the last addition, and diluted to 4 liters with water, washed by decantation 2 times with 4 liter washes, filtered and dried at 120° C. The catalyst was calcined for 3 hours at 400° C. The catalyst had an argon B.E.T. total surface area after evacuation at 260° C. of 256 m$^2$/g. After overnight reduction at 400° C. the catalyst had a metal surface determined by hydrogen chemisorption to be less than one m$^2$/g catalyst, and an argon B.E.T. surface area of only 132 m$^2$/g of catalyst.

An attempt was made to convert benzene to cyclohexane using the iron catalyst prepared above. The reaction conditions were as follows: Pressure: 1 atm.; Temperature: 76°–77° C.; Feed: 90% N-hexane, 10% benzene; Feed rate: 20 cc/hr; H$_2$ rate: 20.4 liters/hour; Catalyst charge: 0.25 gms of catalyst which had been reduced 16 hours at 400° C. Samples of product were taken at 15 minutes, 30 minutes and 60 minutes and there was no sign of benzene conversion in either of these samples. The temperature was raised to 112° C. and the product was sampled to find no conversion of benzene to cyclohexane.

The above tests demonstrate that the non-noble metal silic coprecipitated compositions are not equivalent in their hydrogenation catalytic properties. The above examples show that by increasing the reduced nickel surface area one also increases the hydrogenation capability of the catalyst. However, the cobalt-containing catalyst having a substantially lower reduced metal surface area has a higher selective catalytic activity than the corresponding nickel catalyst. The iron containing composite prepared by the process of U.S. Pat. No. 3,697,445 had substantially no detectable catalytic activity with respect to converting benzene to cyclohexane, whereas the cobalt-containing catalysts of the present invention have good hydrogenation catalytic activity.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for hydrogenating organic compounds which comprises contacting at least one hydrogenatable organic compound with hydrogen in the presence of a calcined and reduced coprecipitated catalyst consisting essentially of cobalt, silica, and solid porous particles, said catalyst being characterized as having a B.E.T. total surface area ranging from about 150 to about 350 m$^2$/g and a reduced metal surface area ranging from about 5 to about 20 m$^2$/g as determined by hydrogen chemisorption, after reduction at 400° C., wherein the amount of cobalt in the catalyst ranges from about 25 wt. % to about 70 wt. % based on the total weight of the calcined and reduced catalyst, wherein said catalyst has been prepared by coprecipitating cobalt and silicate ions in the presence of said solid porous particles.

2. The process of claim 1 wherein said hydrogenation is conducted at a temperature ranging from about 75° C. to about 300° C., at a pressure ranging from about 1 atmosphere to about 12,000 psig, at a feed rate ranging from about 0.2 to about 100 V/Hr/V and at a $H_2$ rate ranging from about 500 to about 10,000 SCF/B.

3. The processes of claim 1 wherein at least one of the organic compounds is benzene.

4. The process of claim 1 wherein at least one of the organic compounds is an aldehyde.

5. The process of claim 1 wherein at least one of the organic compounds is a nitrile.

6. The process of claim 1 wherein at least one of the organic compounds is an olefin.

7. The process of claim 1 wherein the catalyst contains about 0.1 wt. % or less sodium based on the total weight of the active catalyst.

8. The process of claim 1 wherein the solid porous particles are selected from the group consisting of kieselguhr, infusorial earth, diatomaceous earth, siliceous earth, silica and alumina.

9. The process of claim 8 wherein the solid porous particles are kieselguhr.

10. The process of claim 9 wherein the amount of porous solid particles in the catalyst ranges from 10 wt. % to about 70 wt. % based on the total silica in the catalyst.

11. The process of claim 10 wherein the amount of the porous solid particles in the catalyst ranges from 30 wt. % to about 50 wt. % based on the total silica in the catalyst.

* * * * *